United States Patent
Backensto et al.

(10) Patent No.: US 8,984,527 B2
(45) Date of Patent: Mar. 17, 2015

(54) SYSTEM AND METHOD FOR EXECUTION TIME DONATION IN A TIME-PARTITIONING SCHEDULER

(75) Inventors: Keith Backensto, Oakland, CA (US); Thierry Preyssler, Las Vegas, NV (US)

(73) Assignee: Wind River Systems, Inc., Alameda, CA (US)

( * ) Notice: Subject to any disclaimer, the term of this patent is extended or adjusted under 35 U.S.C. 154(b) by 142 days.

(21) Appl. No.: 13/551,091

(22) Filed: Jul. 17, 2012

(65) Prior Publication Data

US 2014/0026149 A1 Jan. 23, 2014

(51) Int. Cl.
  G06F 9/46 (2006.01)
  G06F 9/48 (2006.01)
(52) U.S. Cl.
  CPC .................................. *G06F 9/4881* (2013.01)
  USPC ....................................................... 718/107
(58) Field of Classification Search
  None
  See application file for complete search history.

(56) References Cited

U.S. PATENT DOCUMENTS

| | | | | |
|---|---|---|---|---|
| 5,490,272 A * | 2/1996 | Mathis et al. | | 718/108 |
| 6,035,321 A * | 3/2000 | Mays | | 718/103 |
| 6,757,897 B1 * | 6/2004 | Shi et al. | | 718/102 |
| 7,174,554 B2 * | 2/2007 | Pierce et al. | | 718/107 |
| 7,472,393 B2 * | 12/2008 | Ballantyne | | 718/108 |
| 7,856,636 B2 * | 12/2010 | Bhatia et al. | | 718/108 |
| 2008/0148274 A1 * | 6/2008 | Accapadi et al. | | 718/107 |

* cited by examiner

*Primary Examiner* — Lewis A Bullock, Jr.
*Assistant Examiner* — Jacob Dascomb
(74) *Attorney, Agent, or Firm* — Fay Kaplun & Marcin, LLP (57) ABSTRACT

A system and method donates time from a first process to a second process. The method includes determining a time slice for each of a plurality of processes to generate a schedule therefrom. The method includes determining a time donation scheme for the first process, the time donation scheme indicative of a donation policy in which the execution time of the first process is donated to the second process. During execution of the processes, the method includes receiving a request from the first process for a time donation to the second process and executing the second process during the time slice of the first process.

16 Claims, 9 Drawing Sheets

Time Donation
Effected Sequence
700

| | Time Slice 730 | Time Slice 735 |
|---|---|---|
| 705 Major Frame | A | P |
| 710 Major Frame | A --> M | P --> M |
| 715 Major Frame | M | M |
| 720 Major Frame | M --> S | M |
| 725 Major Frame | S | M |

Fig. 7

Time Donation
Effected Sequence
800

| | Time Slice 830 | Time Slice 835 |
|---|---|---|
| 805 Major Frame | A | P |
| 810 Major Frame | A --> M | P --> M |
| 815 Major Frame | M | M |
| 820 Major Frame | M [M --> S/P] | S |
| 825 Major Frame | M | S |

Fig. 8

Time Donation
Effected Sequence
900

| | Time Slice 935 | Time Slice 940 |
|---|---|---|
| 905 — Major Frame | A | P |
| 910 — Major Frame | A --> M | P --> M |
| 915 — Major Frame | M | M |
| 920 — Major Frame | M --> S/A | M |
| 925 — Major Frame | S | M --> S/B |
| 930 — Major Frame | S | S |

Fig. 9

Time Donation
Effected Sequence
1000

| | Time Slice 1030 | Time Slice 1035 |
|---|---|---|
| 1005 — Major Frame | A | P |
| 1010 — Major Frame | A --> S | P --> S |
| 1015 — Major Frame | S | S |
| 1020 — Major Frame | A <-- S | S |
| 1025 — Major Frame | A | S |

SYSTEM AND METHOD FOR EXECUTION
TIME DONATION IN A TIME-PARTITIONING
SCHEDULER

BACKGROUND INFORMATION

A scheduler in a computing environment allows for a plurality of processes to be run in a predetermined order and/or concurrently. The scheduler may determine a sequence at which the processes run so that each process is allowed access to a processor at a particular time. In a first use, the scheduler may allow for a single process to complete prior to any other process, such as when the scheduler includes priority data regarding the various processes to be run. In a second use, the scheduler may allow for a process to be run for a predetermined amount of time at which point a further process is allowed to run for a further predetermined amount of time.

The conventional scheduler does not provide a way for a process to release its execution time to another process within its fixed time window. This may result in process synchronization and message passing being a relatively slow affair. Client processes are required to wait for their respective time window to end while server processes must wait for their respective time window to begin before messages may be sent and received. This results in wasting execution time and reducing performance. There may be potential waste within a time slice for a first process that does not require the entire, allotted time when a second process could benefit from use of the unneeded time of the first process.

SUMMARY OF THE INVENTION

The exemplary embodiments describe a device and method for donating execution time from a first process to a second process. The method comprises determining a time slice duration for each of a plurality of processes. The method comprises generating a schedule as a function of the time slices, where the schedule includes an order for each of the time slices for a respective one of the plurality of processes. The method comprises determining a time donation scheme for a first one of the processes, the time donation scheme being indicative of a donation policy in which an execution time of the first process is donated to a second one of the processes. During execution of the processes in accordance with the schedule, the method comprises receiving a request from the first process for a time donation to the second process and executing the second process during the time slice of the first process.

DETAILED DESCRIPTION

The exemplary embodiments may be further understood with reference to the following description of the exemplary embodiments and the related appended drawings, wherein like elements are provided with the same reference numerals. The exemplary embodiments are related to a device and method for execution donation in a time-partitioning scheduler. Specifically, the execution donation is performed during a time in which a process that does not require an entirety of an allotted time or subsequent allotted times to donate the remainder to another process.

Figure 1:
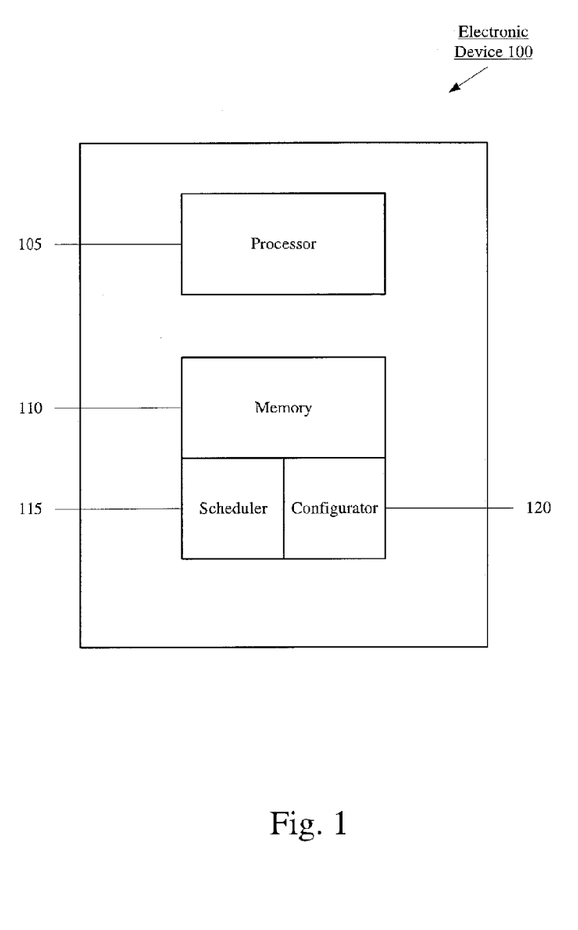
FIG. 1 shows an electronic device including a scheduler according to an exemplary embodiment of the present invention.

FIG. 1 shows an electronic device 100 including a scheduler 115 according to an exemplary embodiment of the present invention. The electronic device 100 may represent any electronic device such as a desktop computer, a laptop computer, a handheld device (e.g., cellular phone, personal digital assistant, scanner, etc.), etc. In a specific exemplary embodiment, the electronic device 100 may relate to a field of aviation in which the scheduler 115 may be an ARINC 653 scheduler. It should be noted that the electronic device 100 may include conventional components such as a memory arrangement 110, a transceiver, an input/output device, a display, etc.

The exemplary embodiments of the present invention may be applied to the processor 105 executing the scheduler 115. The scheduler 115 may be any component of the electronic device 100 configured to determine access for a thread, process, or data flow to a resource such as the processor 105. Specifically, the scheduler 115 may be embodied as a separate hardware component configured to perform its functionality or, as illustrated, may be a software component executed by the processor 105 to perform its functionality. The scheduling of the processes may be performed using a variety of ways. A configurator 120 of the electronic device 100 may specify the duration for each time slice at configuration time. It should be noted that the configurator 120 may represent any form that specifies the durations. In a first example, the configurator 120 may be represented as a software component such as configuration file or program that generates a configuration statically. In a second example, the configurator 120 may be represented as a component of the electronic device 100 configured with the functionality described above. The time slice may be a portion of time that has a pre-defined duration with a start and an end, allocating a period of time for a respective process to be run therein. It should be noted that the duration may be configured in any unit of time (e.g., nanoseconds, clock ticks, etc.). When a time slice is scheduled, it may be scheduled for its full duration. The duration of one time slice is independent of the duration of all other time slices. Time slices are scheduled in the order specified by the schedule. Once every time slice in the schedule has been executed, the scheduler 115 restarts the beginning of the schedule.

It should be noted that the representation of the scheduler 115 and the configurator 120 as software components is only exemplary. According to the illustrated exemplary embodiments, the scheduler 115 and the configurator 120 may be software components with the above-described functionalities stored on the memory arrangement 110 for the processor 105 to execute. However, those skilled in the art will understand that the scheduler 115, the configurator 120, or both components may be separate or combined hardware components configured to perform their respective functionalities.

Figure 2:
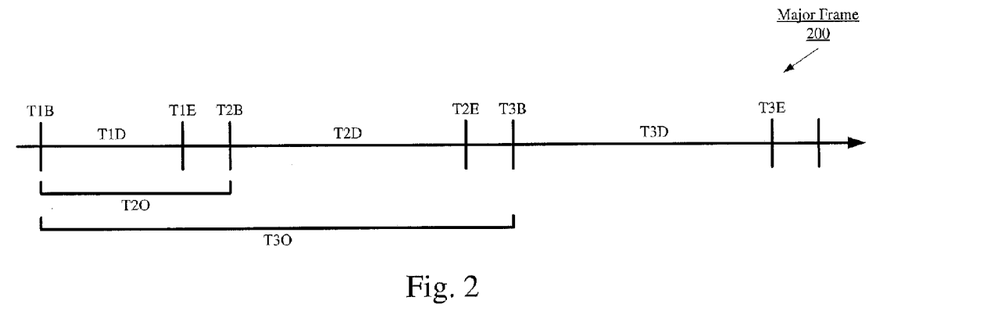
FIG. 2 shows a major frame of a scheduler according to an exemplary embodiment of the present invention.

FIG. 2 shows a major frame 200 of the scheduler 115 according to an exemplary embodiment of the present invention. As discussed above, one or more time slices may be grouped together into a schedule that are defined by the configurator 120 at configuration time. The sum of all the time slices in a schedule may be the major frame 200. Thus, the major frame 200 may be a single run of each time slice included therein until the major frame 200 is repeated at a subsequent time (e.g., upon the major frame duration lapsing). As illustrated, the major frame duration 200 may include three distinct time slices.

It should be noted that the use of three time slices is only exemplary. The major frame 200 may include any number of time slices. To simplify how the scheduler 115 operates, the major frame 200 is described herein with three time slices.

The major frame 200 may include three time slices, T1D, T2D, and T3D in which a respective process is allowed to run. Each time slice may include a beginning and an end. Thus, the time slice T1D has a beginning at T1B and an end at T1E; the time slice T2D has a beginning at T2B and an end at T2B; the time slice T3D has a beginning at T3B and an end at T3E. When the entirety of the time slice T1D lapses at the end point T1E, the major frame 200 indicates that the resource, such as the processor 105, is unassigned from the first process (e.g., via an interrupt) and assigned to the second process. This process may continue for each time slice. FIG. 2 further illustrates an offset time in which the second time slice begins as T20, and an offset time in which the third time slice begins as T30.

By determining the major frame 200 prior to the schedule being run, the schedule may be executed in a deterministic manner. Upon completion of the major frame 200, the major frame 200 is repeated, starting with the first time slice T1B.

According to the exemplary embodiments of the present invention, execution time donation may be performed during the time slices T1D, T2D, and T3D. As discussed above, a respective process is designated to be run during each of the time slices T1D, T2D, and T3D.

The configurator 120 may be configured to designate a process to be run in each time slice. The process that is configured to run during a particular time slice may specifically be designated as a "master" process. Thus, when a time slice is first scheduled, the scheduler 115 selects the time slice's master process to execute for the duration of the time slice. It should be noted that a process may be a master of one or more time slices.

A further process that is allowed to be donated execution time may be designated as a "server" process. Thus, the configurator 120 may permit a process to donate its execution time to one or more server processes. The process that donates its execution time may be designated as a "client" process. Accordingly, the initial client process within a time slice is the master process. When the master process as the client process donates its time to a first server process, the first server process may become the client process that also is able to donate its time to a further server process. Time donation allows the client process to release its execution time to the server process to service a request immediately. Therefore, the server process is not required to wait for its respective time slice within the schedule to begin, thereby enabling a faster response time between logically connected processes. Furthermore, the server process is not required to be configured as the master of a time slice at all, executing solely on demand.

As discussed above, the execution donation policy may be predetermined so that a first client process is allowed to donate time to a first server process (which then becomes the second client process). The second client process may then be allowed to donate time to a second server process (which then becomes the third client process). In this manner, a time donation chain may be established and preset at configuration time by the configurator 120. The time donation chain may be as deep as the configurator 120 allows.

Figure 3:
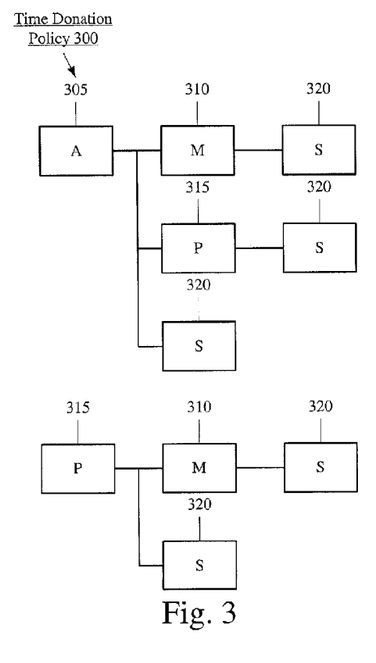
FIG. 3 shows a time donation policy according to an exemplary embodiment of the present invention.

FIG. 3 shows a time donation policy 300 according to an exemplary embodiment of the present invention. The time donation policy 300 relates to the preset manner in which a client process is allowed to donate time to a server process. That is, the time donation policy 300 may be a donation policy for the process running in a particular time slice. As illustrated, the process A 305 may represent the master process of the time slice in which the time donation policy 300 applies. Accordingly, the process A 305 may also be the initial client for the time donation chain. The time donation policy 300 indicates that the process A 305 may donate execution time to one of three server processes: process M 310, process P 315, or process S 320. The time donation policy 300 may also indicate a further server that may be donated time from a subsequent client process upon process A 305 donating time thereto. Therefore, if the process M 310 were to become the client process in the time slice, process M 310 may donate time to process S 320. If the process P 315 were to become the client process in the time slice, the process P 315 may donate time to process S 320. The time donation policy 300 also indicates that process S 320 is not configured to donate time to any other process. The time donation policy 300 further indicates that a process may receive execution time from multiple processes. In a substantially similar manner, the time donation policy 300 may further indicate that the process P 315 may donate execution time to one of two server processes: process M 310 and process S 320. The time donation policy 300 may further indicate that the process M 310 is further configured to donate execution time to process S 320 within the time donation chain of process P 315. Therefore, upon beginning the schedule, the time donation policy 300 dictates a manner in which the time donation may proceed as a function of which process is currently the client process and the available server processes thereto.

A process may donate its execution time by notifying the scheduler 115, for example, by calling an "execution-donate" function or system call. A client process may pass the identification of the server process that is to receive the donated execution time as well as the identification of the master process that originated the time donation chain. The scheduler 115 may validate the process that is authorized to donate its execution to the server process through referencing the time donation policy 300. If the donation is not authorized an error may be returned.

When a sever process is switched in during a time slice by being donated execution time, the scheduler 115 may set a flag in a status structure visible to the process to indicate that the server process is executing on donated time. The scheduler 115 may also store the identification of the server's client and the identification of the server's master in the process's status structure. This enables the server process to be aware of which process it is executing on behalf thereof as well as which process originated the time donation chain. Through this awareness, the time donation policy 300 may be maintained since the client process that donates execution time may differ from the master process, particularly if the time donation chain is more than one level deep. However, if a server process donates its execution time, creating a donation chain more than one level deep, the same rules as described above will apply. Therefore, the client process invokes the execution-donate function with the identification of the server process it wants to donate time thereto and the identification of the master process that originated the time donation chain, which is stored in the status structure.

Figure 4:
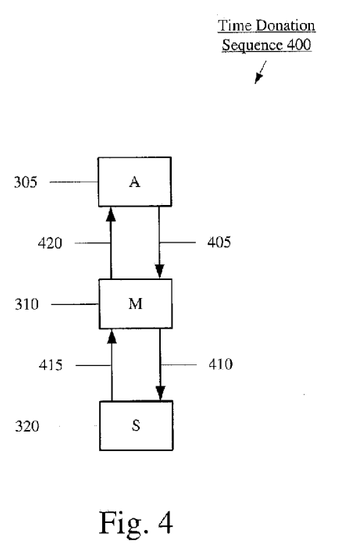
FIG. 4 shows a time donation sequence according to an exemplary embodiment of the present invention.

FIG. 4 shows a time donation sequence 400 according to an exemplary embodiment of the present invention. Specifically, the time donation sequence 400 relates to the predetermined order indicated by the time donation policy 300. Furthermore, the time donation sequence 400 relates to when process A 305 is the master process and is the first client process while process M 310 is the first server process and subsequently, process M 310 is the second client process while process S is the second server process. Therefore, the time donation sequence 400 is for the specific example in which the time donation policy 300 is as described above. As illustrated, since the information regarding the time donation is stored in the server process's status structure, it is known that the client process A 305 donated time to the server process M 310 via 405. Subsequently, it is known that the client process M 310 donated time to the server process S 320 via 410. Therefore, a return call may indicate that the server process S 320 must first return to client process M 310 via 415. Finally, the server process M 310 must then return to client process A 305 via 420.

Figure 5:
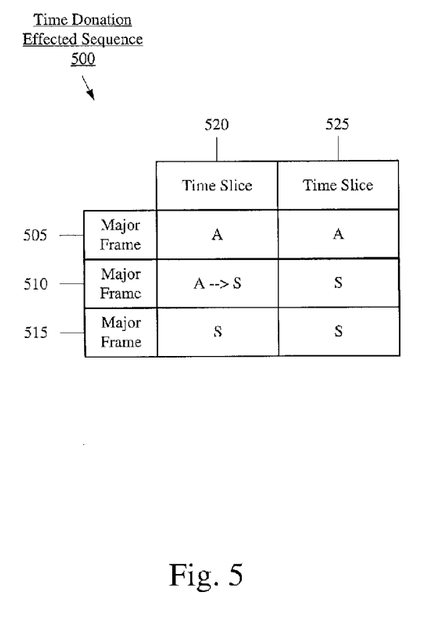
FIG. 5 shows a first time donation effected sequence according to an exemplary embodiment of the present invention.

FIG. 5 shows a first time donation effected sequence 500 according to an exemplary embodiment of the present invention. Specifically, the scheduler 115 may update the manner in which the schedule is to be executed upon prior time donations that have already occurred. That is, the scheduler 115 may be aware that should a time donation occur, an assumption may be made that the process that donates time no longer requires execution time, thereby not needing to acquire the resource such as the processor 105. Accordingly, the server process, as dictated by the time donation policy 300, may replace each instance the client process has a time slice in a major frame and was scheduled to run therein. It should again be noted that the time donation effected sequence 500 is for the specific example as described below.

The time donation effected sequence 500 is illustrated as a grid with a major frame 505, a major frame 510, and a major frame 515. That is, the schedule has begun and the time donation effected sequence 500 relates to when the major frame has run three times. The grid also shows a time slice 520 and a time slice 525. In this specific exemplary embodiment of the present invention, the time slice 520 may be T1D while the time slice 525 may be T2D. Furthermore, the same process represented by process A 305 is shown to be run in both time slice 520 and time slice 525 during the major frame 505.

Thus, process A is the master process of both time slice 520 and time slice 525. In the second major frame 510, during time slice 520, an execution time donation occurs in which process A 305 donates time to process S 320. As discussed above, the assumption is now made that process A 305 no longer requires execution time. Therefore, the scheduler 115 may replace process A 305 in time slice 520 as well as in the subsequent time slice 525 during the second major frame 510 with process S 320. Accordingly, in the third major frame 515, process A 305 has been replaced with process S 320 in time slices 520 and 525. Thus, the schedule may be optimized with increased execution and performance since process S 320 is allowed to serve requests immediately, without the need to wait for a dedicated time slice that may be underutilized the majority of the time.

Figure 6:
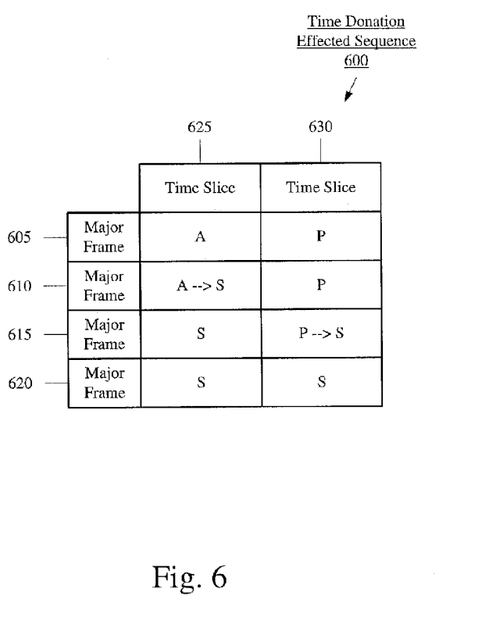
FIG. 6 shows a second time donation effected sequence according to an exemplary embodiment of the present invention.

FIG. 6 shows a second time donation effected sequence 600 according to an exemplary embodiment of the present invention. The time donation effected sequence 600 is also illustrated as a grid with a major frame 605, a major frame 610, a major frame 615, and a major frame 620 and also time slice 625 and time slice 630. In a manner substantially described with regard to the first time donation effected sequence 500 of FIG. 5, the time donation effected sequence 600 may operate in a similar manner. The time donation effected sequence 600 further relates to a specific exemplary embodiment in which two separate time donations are performed by two different master processes.

As illustrated in FIG. 6, the first major frame 605 may enable process A 305 to run in time slice 625 while process P 315 is run in time slice 630. Thus, process A 305 is the master of time slice 625 and process P 315 is the master of time slice 630. In the second major frame 610, process A 305 donates execution time to process S 320 in time slice 625 while process P 315 continues to run in time slice 630. As discussed above, in the third major frame 620, process S 320 replaces process A 305 in the time slice 625. Furthermore in major frame 615, process P 315 donates execution time to process S 320 in time slice 630. Accordingly, in major frame 620, process S 320 runs in time slice 625 from the time donation chain of master process A 305 and runs in time slice 630 from the time donation chain of master process P 315.

Figure 7:
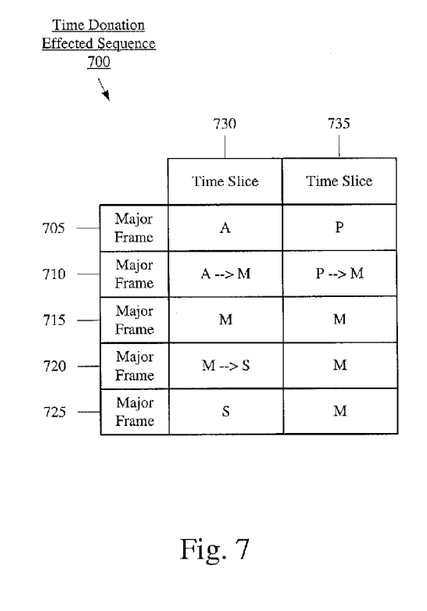
FIG. 7 shows a third time donation effected sequence according to an exemplary embodiment of the present invention.

FIG. 7 shows a third donation effected sequence 700 according to an exemplary embodiment of the present invention. The time donation effected sequence 700 is also illustrated as a grid with a major frame 705, a major frame 710, a major frame 715, a major frame 720, and a major frame 725 with a time slice 730 and a time slice 735. In a manner substantially described with regard to the first time donation effected sequence 500 of FIG. 5, the time donation effected sequence 700 may operate in a similar manner. The time donation effected sequence 700 further relates to a specific exemplary embodiment in which two separate time donations are performed by two different master processes and a time donation one further level is performed.

As illustrated in FIG. 7, the first major frame 705 may enable process A 305 to run in time slice 730 while process P 315 is run in time slice 735. Thus, process A 305 is the master of the time slice 730 and process P 315 is the master of time slice 735. In the second major frame 710, process A 305 donates execution time to process M 310 in time slice 730 while process P 315 donates execution time to process M 310 in time slice 630. Therefore, process M 310 is in the time donation chain of master process A 305 within time slice 730, and is in the time donation chain of master process P 315 within time slice 735. Accordingly, in the third major frame 715, process M 310 is run in both time slice 730 and time slice 735. In the fourth major frame 720, process M 310 donates execution time to process S 320 in time slice 730 along the time donation chain of process A 305, while process M 310 continues to run in time slice 735. This is because within time slice 735, process M is in the time donation chain of master process P 315, which does not have a donation to process S 320 at that time. Therefore, in the fifth major frame 725, process S 320 is run in time slice 730 and process M 310 continues to run in time slice 735. It is also noted that the time donation policy of master process P 315 may be configured to allow donations to process M 310, but to disallow donations from process M 310 to a further process.

Figure 8:
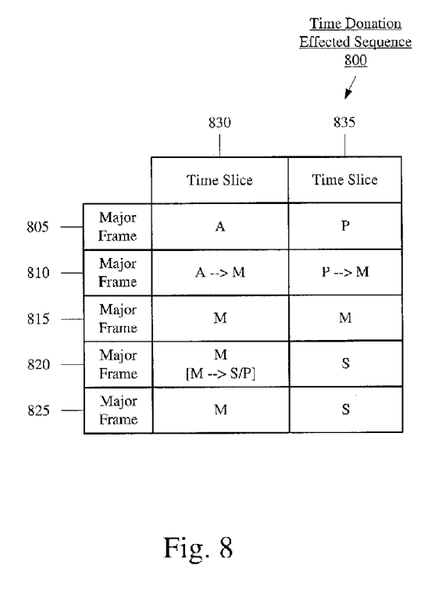
FIG. 8 shows a fourth time donation effected sequence according to an exemplary embodiment of the present invention.

FIG. 8 shows a fourth donation effected sequence 800 according to an exemplary embodiment of the present invention. The time donation effected sequence 800 is also illustrated as a grid with a major frame 805, a major frame 810, a major frame 815, a major frame 820, and a major frame 825 with a time slice 830 and a time slice 835. In a manner substantially described with regard to the first time donation effected sequence 500 of FIG. 5, the time donation effected sequence 800 may operate in a similar manner. The time donation effected sequence 800 further relates to a specific exemplary embodiment in which two separate time donations are performed by two different master processes, and a time donation one further level during a different time slice is performed.

As illustrated in FIG. 8, the first major frame 805 may enable process A 305 to run in the time slice 830 while process P is run in time slice 835. Thus, process A 305 is the master of time slice 830 and process P 315 is the master of time slice 835. In the second major frame 810, process A 305 donates execution time to process M 310 in time slice 830 while process P 315 donates execution time to process M 310 in time slice 835. Therefore, process M 310 is in the time donation chain of master process A 305 within time slice 830, and is in the time donation chain of master process P 315 within time slice 835. Accordingly, in the third major frame 815, process M is run in both time slice 830 and time slice 835. In the fourth major frame 820, process M 310 is run in time slice 830. However, in this exemplary embodiment, process M 310 is set to donate time to process S 320 along the time donation chain of process P 315. That is, a process is not required to donate time while currently executing in the time donation chain's master's time slice. Therefore, the time donation may be set on behalf of master process P 315 during time slice 830 while process M 310 is executing from the time donation chain of master process A 305. Accordingly, when time slice 835 is run during the major frame 820, process S 320 is run. Given the above donation chains, in the fifth major frame 825, process M 310 is run during time slice 830 while process S 820 is run during time slice 835.

Figure 9:
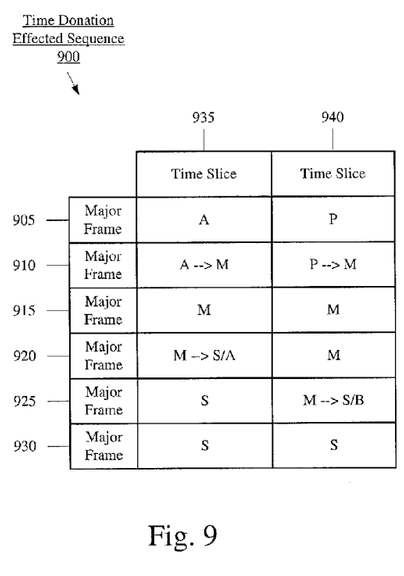
FIG. 9 shows a fifth time donation effected sequence according to an exemplary embodiment of the present invention.

FIG. 9 shows a fifth donation effected sequence 900 according to an exemplary embodiment of the present invention. The time donation effected sequence 900 is also illustrated as a grid with a major frame 905, a major frame 910, a major frame 915, a major frame 920, a major frame 925, and a major frame 930 with a time slice 935 and a time slice 940. In a manner substantially described with regard to the first time donation effected sequence 500 of FIG. 5, the time donation effected sequence 900 may operate in a similar manner. The time donation effected sequence 900 further relates to a specific exemplary embodiment in which two separate time donations are performed by two different master processes and a time donation one further level for each time donation is performed.

As illustrated in FIG. 9, the first major frame 905 may enable process A 305 to run in the time slice 935 while process P 315 is run in time slice 940. Thus, process A 305 is the master of time slice 935 and process P 315 is the master of time slice 940. In the second major frame 910, process A 305 donates execution time to process M 310 in time slice 935 while process P 315 donates execution time to process M 310 in time slice 940. Therefore, process M 310 is in the time donation chain of master process A 305 within time slice 935, and is in the time donation chain of master process P 315 within time slice 940. Accordingly, in the third major frame 915, process M 310 is run in both time slice 935 and time slice 940. In the fourth major frame 920, process M 310 donates time to process S 320 from the time donation chain of process A 305 while process M 310 continues to run in time slice 940. In the fifth major frame 925, process S 320 is run in time slice 935 while process M 310 donates time to process S 320 from the time donation chain of process P 315. Thus, in the sixth major frame 930, process S 320 is run in time slice 935 and time slice 940. Because process S 320 is run from a different time donation chain in each time slice, the status structure enables process S 320 to determine which time donation chain it is executing within at any point in time.

Specifying the master process when donating time also prevents a process from accidentally donating time from the wrong time donation chain. For example, if a process is scheduled in more than one time slice and invokes the execution-donate function just before the time slice is switched out, the scheduler 115 may not receive the request until the process's next time slice because the invocation may be interrupted by an interrupt to trigger the time slice switch. The scheduler 115 would then have to assume the process donated time in the process's current time slice, not a previous time slice. If the time slices contain different master processes, the process would then be donating time from the wrong time donation chain. By specifying the master process when making the time donation request, there is no ambiguity and race conditions do not exist.

Figure 10:
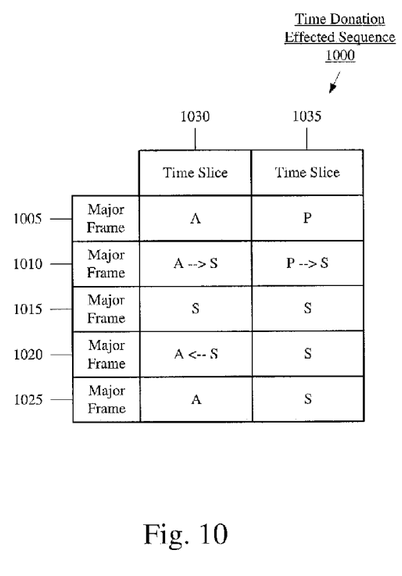
FIG. 10 shows a sixth time donation effected sequence according to an exemplary embodiment of the present invention.

FIG. 10 shows a sixth donation effected sequence 1000 according to an exemplary embodiment of the present invention. The time donation effected sequence 1000 is also illustrated as a grid with a major frame 1005, a major frame 1010, a major frame 1015, a major frame 1020, and a major frame 1025 with a time slice 1030 and a time slice 1035. In a manner substantially described with regard to the first time donation effected sequence 500 of FIG. 5, the time donation effected sequence 1000 may operate in a similar manner. The time donation effected sequence 1000 further relates to a specific exemplary embodiment in which a return from the time donation chain is performed.

As illustrated in FIG. 10, the first major frame 1005 may enable process A 305 to run in time slice 1030 while process P 315 is run in time slice 1035. Thus, process A 305 is the master of time slice 1030 and process P 315 is the master of time slice 1035. In the second major frame 1010, process A 305 donates execution time to process S 320 in time slice 1030 while process P 315 donates execution time to process S 320 in time slice 1035. Therefore, process M 310 is in the time donation chain of master process A 305 within time slice 1030, and is in the time donation chain of master process P 315 within time slice 1035. Accordingly, in the third major frame 1015, process S 320 is run in both time slice 1030 and time slice 1035. In the fourth major frame 1020, process S 320 returns execution time to process A 305 in time slice 1030 while process S 320 continues to run in time slice 1035 from the time donation chain of process P 315. Thus, in the fifth major frame 1025, process A 305 is run in time slice 1030 while process S 320 continues to run in time slice 1035.

A process may return execution time to its client by notifying the scheduler 115, e.g., by calling an "execution-return"

function or system call. The process may pass the identification of the client process to which time is returned as well as the identification of the master process that originated the time donation chain. The scheduler 115 may then verify the process was donated time by the client process in the master process's time slice in accordance with the time donation policy, as was described in FIG. 4. Therefore, the execution time may properly be returned to the client process in the correct time donation chain. Furthermore, when a process returns time to a client process within the master process's time slice, the scheduler 115 may immediately switch the client process back in.

Figure 11:
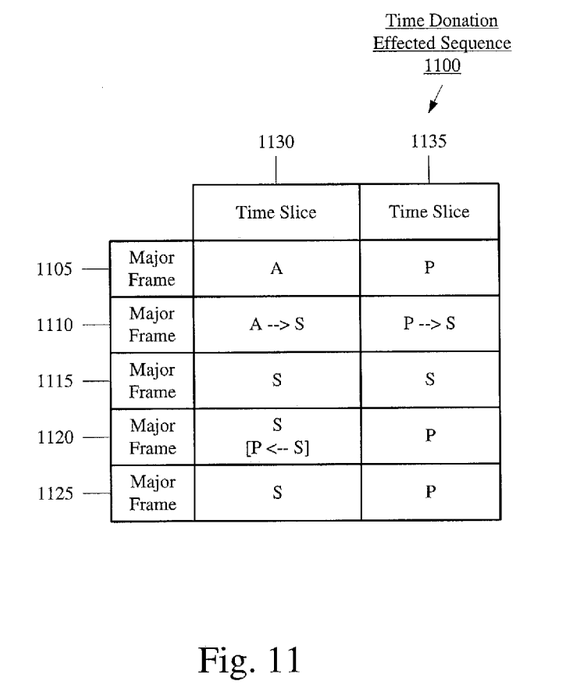
FIG. 11 shows a seventh time donation effected sequence according to an exemplary embodiment of the present invention.

FIG. 11 shows a seventh donation effected sequence 1100 according to an exemplary embodiment of the present invention. The time donation effected sequence 1100 is also illustrated as a grid with a major frame 1105, a major frame 1110, a major frame 1115, a major frame 1120, and a major frame 1125 with a time slice 1130 and a time slice 1135. In a manner substantially described with regard to the first time donation effected sequence 500 of FIG. 5, the time donation effected sequence 1100 may operate in a similar manner. The time donation effected sequence 1100 further relates to a specific exemplary embodiment in which a return from the time donation chain is performed in a time slice that is not owned by the time donation chain's master process.

As illustrated in FIG. 11, the first major frame 1105 may enable process A 305 to run in the time slice 1130 while process P 315 is run in time slice 1135. Thus, process A 305 is the master of time slice 1130 and process P 315 is the master of time slice 1135. In the second major frame 1110, process A 305 donates execution time to process S 320 in time slice 1130 while process P 315 donates execution time to process S 320 in time slice 1135. Therefore, process M 310 is in the time donation chain of master process A 305 within time slice 1130, and is in the time donation chain of master process P 315 within time slice 1135. Accordingly, in the third major frame 1115, process S 320 is run in both time slice 1130 and time slice 1135. In a manner similar to execution time donation, as described in FIG. 8, a process is not required to return time while currently executing in the time donation chain's master process's time slice. Thus, in the fourth major frame 1120, process S 320 is set to return execution time to process P 315 in time slice 1130. Because process S 320 is still executing from the time donation chain of process A 305, process S 320 continues to run in time slice 1130. In time slice 1135, process P 315 is then scheduled to run. In the fifth major frame 1125, process S 320 is run in time slice 1130 and process P 315 is run in time slice 1135.

It should be noted that the scheduler 115 may not use the time slice that is currently scheduled to determine which process to return time thereto. Specifically, if the scheduler 115 relied on a current state, timing may become an issue. For example, if process S 320 of the third major frame 1115 in time slice 1135 wanted to return time to process P 315 implicitly by invoking the execution-return function, a time slice switch may occur just as the execution-return function is invoked. The scheduler 115 may then handle the request in time slice 1130 of the fourth major frame 1120 and may incorrectly assume that process S 320 wants to return time to process A 305, not process P 315. By having the server specify the client process and the master process to which time is returned, there is no ambiguity and race conditions do not exist.

It should also be noted that according to the exemplary embodiments of the present invention, if a process on donated time is suspended, the time donation chain stemming from the master process may be frozen. Accordingly, the scheduler 115 does not automatically reschedule the client. Instead, a special process called idle process may be scheduled to prevent the scheduler 115 from needing an idle loop. However, a process may be restarted, e.g., via a "process-restart" function or system call, and this may resurrect the time donation chain.

With regard to the above exemplary embodiments for donating time and returning time, the scheduler 115 may use a stack to track the time donation chain for each time slice for a respective major frame. One process stack may be created for each master process that owns a time slice and each time slice references its owner's process stack. Each stack may be initialized with a reference to the master process at the top of the stack. Thus, when a process donates time, a reference to the server process is pushed onto the master process's stack. Likewise, when a process returns time, its reference is removed from the master's stack, thereby maintaining the donation chain of the master process in the stack. When a time slice is scheduled, the scheduler 115 may schedule the process on top of its stack. If the process on top of the stack is suspended, the idle process may be scheduled instead. A process's stack is also not pruned when a process is suspended because processes may be restarted via the process-restart function. Since process stacks are left alone on suspend, a restarted process may still be able to return time to its client, resurrecting its time donation chain.

Figure 12:
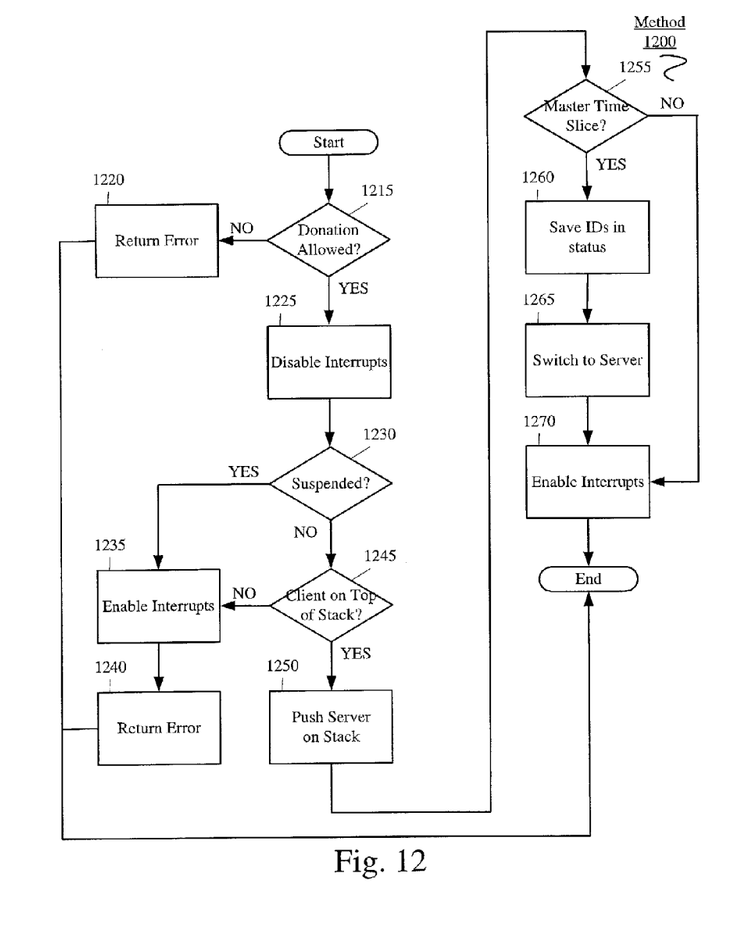
FIG. 12 shows a method for donating execution time according to an exemplary embodiment of the present invention.

FIG. 12 shows a method 1200 for donating execution time according to an exemplary embodiment of the present invention. The method 1200 relates to when a client process donates time to a server process. The method 1200 will be described with reference to the time donation effected sequences described above.

In step 1215, a determination is made whether the request for the time donation is allowed. A time donation request may consist of the identification of the server process that is to receive the donated execution time, as well as the identification of the master process that originated the time donation chain. For example, with regard to FIG. 6, the time donation sequence for process A 305 may be verified from the time donation policy 300 that was configured as illustrated in FIG. 3. If the requested donation is not allowed, the method 1200 continues to step 1220 where an error is returned.

Returning to step 1215, if the requested donation is allowed, the method 1200 continues to step 1225. In step 1225, interrupts are disabled. Those skilled in the art will understand that when the time donation is performed, an interrupt may disrupt the time donation from being properly processed. Therefore, the interrupts are disabled when the requested donation is permitted.

In step 1230, a determination is made whether the server process that is to receive the time donation is in a suspended state. That is, the process represented by the server process may be suspended from being executed. When the server process is suspended, the method 1200 continues to step 1235 where interrupts are again enabled and in step 1240, an error is returned.

Returning to step 1230, if the server process is not suspended, the method 1200 continues to step 1245 where a determination is made whether the client process is on top of the time donation stack of the master process that originated the time donation chain as specified in the time donation request. As discussed above, the scheduler 115 may maintain a stack for each master process to track each time donation sequence. When the client process is not on top of the stack, the method 1200 continues to step 1235 where interrupts are enabled and in step 1240, an error is returned.

Returning to step 1245, if the client process is on top of the stack, the method 1200 continues to step 1250 where the server process is pushed on the stack of the master process specified in the time donation request. Therefore, the stack reflects the time donation chain of the master process, and the scheduler 115 is aware that the server process is to be run on donated time from the client process.

In step 1255, a determination is made whether the time donation is being performed during the specified master process's time slice. As discussed above, the time donation may occur during the master process's time slice such as in time slice 625 of the major frame 610 in the time donation effected sequence 600 of FIG. 6. The time donation may also be set outside the master process's time slice such as in the time slice 830 of the major frame 820 in the time donation effected sequence 800 of FIG. 8. If the specified master process's time slice is not scheduled when the time donation is being performed, the expected time donation may be recorded, but rescheduling may be deferred and the method 1200 continues to step 1270 in which interrupts are again enabled.

Returning to step 1255, if the time donation is being performed during the master process's time slice, the method 1200 continues to step 1260 where the identifications of the client and master processes are saved in the status structure of the server process. As discussed above, the identifications may be stored so that subsequent time donations or time returns may be made without ambiguity so race conditions do not exist.

In step 1265, the server process is switched thereto and allowed to run on donated time within the time slice. For example, in time slice 625 of major frame 610 of the time donation effected sequence 600 of FIG. 6, upon client process A 305 donating time to server process S 320, process S 320 is allowed to run on donated time during the time slice 625 which is otherwise scheduled for process A 305 only. Then in step 1270, interrupts are again enabled.

Figure 13:
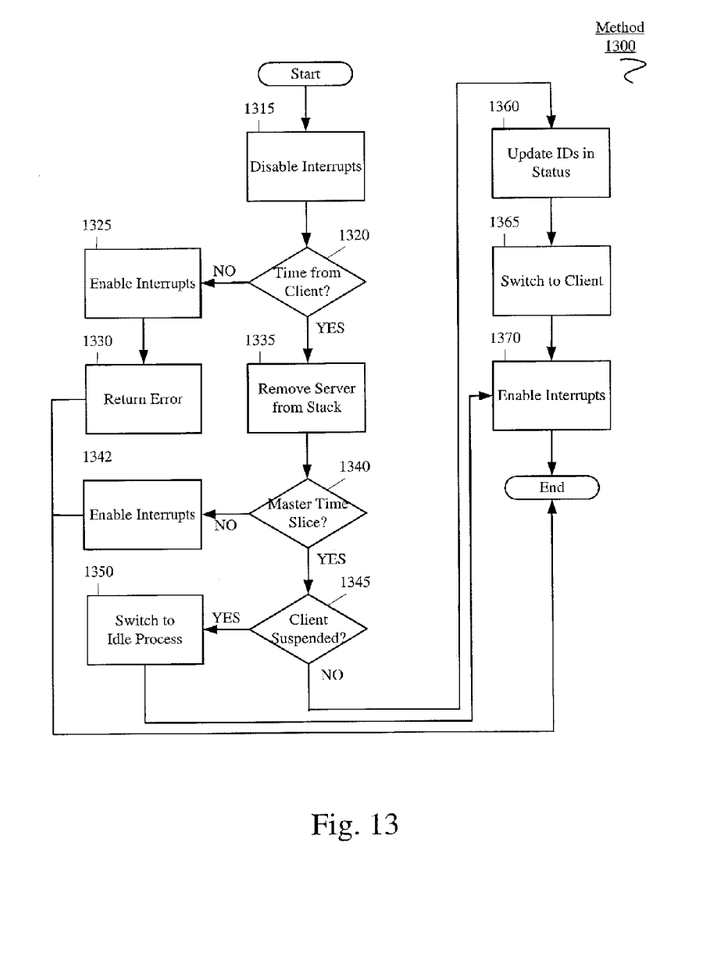
FIG. 13 shows a method for returning donated execution time according to an exemplary embodiment of the present invention.

FIG. 13 shows a method 1300 for returning execution time according to an exemplary embodiment of the present invention. The method 1300 relates to when a server process returns execution time to a client process. The method 1300 will be described with reference to the time donation effected sequences described above.

In step 1315, interrupts are disabled. Again, those skilled in the art will understand that when the time return is performed, an interrupt may disrupt the time return from being properly processed. Therefore, the interrupts are disabled.

In step 1320, a determination is made whether the request for time return is allowed. A time return request may consist of the identification of the client process that is to be return execution time, as well as the identification of the master process that originated the time donation chain. If the determination indicates that the process was not donated time by the specified client process from the time donation chain of the specified master process, the method 1300 continues to step 1325 in which interrupts are again enabled and in step 1330, an error is returned.

Returning to step 1320, if the process had been donated time by the specified client process from the time donation chain of the specified master process, the method 1300 continues to step 1335 where the process (i.e., the server) is removed from the top of the time donation stack of the specified master process. As discussed above in the method 1200, the server process that runs on donated time may be placed on the stack to indicate the time donation sequence that has occurred. Thus, once the time is returned, the server process is subsequently removed from the stack.

In step 1340, a determination is made whether the time return is being performed in the specified master process's time slice. As discussed above, the time return may occur during the specified master process's time slice, such as in time slice 1030 of the major frame 1020 in the time donation effected sequence 1000 of FIG. 10. The time return may also be set outside the specified master process's time slice such as in the time slice 1130 of the major frame 1120 in the time donation effected sequence 1100 of FIG. 11. If the specified master process's time slice is not scheduled when the time return is being performed, the expected time return may be recorded, but rescheduling may be deferred and the method 1300 continues to step 1342 in which interrupts are again enabled.

Returning to step 1340, if the time return is being performed in the specified master process's time slice, the method 1300 continues to step 1345 where a determination is made whether the client process is suspended. That is, the process in which the time is being returned may be suspended from being executed. If the client process is suspended, the method 1300 continues to step 1350 where an idle process is scheduled for execution instead. As discussed above, the idle process may be a special process that prevents the scheduler from having to perform an idle loop. The method 1300 then continues to step 1370 in which interrupts are again enabled.

Returning to step 1345, if the client process is not suspended, the method 1300 continues to step 1360 where the identifications in the client process's status structure are updated. Specifically, if the client process is also on donated time, the client process's status structure is updated with the identification of client process's client process and the identification of the master process that originated the time donation chain. As discussed above, this allows for subsequent time donations or time returns to be made without ambiguity so race conditions do not exist, particularly when the client process is scheduled in multiple time slices, such as described in the time donation effected sequence 1100 of FIG. 11.

In step 1365, the client process is switched thereto and the donated time is returned. Then in step 1370, the interrupts are again enabled upon the time return being completed.

The exemplary embodiments of the present invention enable execution time donation to occur in which a process is allowed to give at least a portion of the time slice in which it is scheduled to run to a further process. The time donation policy may be predetermined at configuration time and prior to the schedule running so that the scheduler is always aware of how to allow the time donation to occur. In this manner, execution time is not wasted and performance is enhanced by allowing a process that requires additional time to execute in a shorter time frame than which it has been assigned by borrowing time from a process that does not require a surplus time that has been scheduled thereto.

Those skilled in the art will understand that the above-described exemplary embodiments may be implemented in any number of manners, including, as a separate software module, as a combination of hardware and software, etc. For example, the scheduler and the configurator may be programs containing lines of code that, when compiled, may be executed on the processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:
1. A device, comprising:
a processor configured to run a first plurality of processes;
a configurator configured to determine a time slice for each of the first plurality of processes, the configurator further configured to determine a time donation scheme for a first one of the first plurality of processes, the time donation scheme comprising:
- a donation policy which specifies a sequence of two or more processes from a second plurality of processes to which a portion of the time slice for the first one of the first plurality of processes will be donated;
- wherein each process in the sequence of two or more processes from the second plurality of processes is able to donate it's time to a subsequent process in the sequence of two or more processes from the second plurality of processes;
- a time donation chain comprising the first one of the first plurality of processes and the sequence of two or more processes from the second plurality of processes;
- the donation policy indicating the time slice should be returned to the first one of the first plurality of processes upon completion of the sequence of two or more processes from the second plurality of processes;
- a scheduler configured to generate a schedule as a function of the time slices, the schedule including an order for each of the time slices for a respective one of the first plurality of processes,
- wherein, during execution of the first plurality of processes in accordance with the schedule, the scheduler is configured to:
- receive, from a respective process in the time donation chain, a request to donate, to a respective subsequent process in the time donation chain, the time slice of the first one of the first plurality of processes;
- determine whether the request complies with the donation policy;
- when the request complies with the donation policy, disable interrupts and execute the respective subsequent process during the time slice of the first one of the first plurality of processes; and
- upon return of the time slice to the first one of the first plurality of processes, enable interrupts; and
- when the request does not comply with the donation policy, generate an error.

2. The device of claim 1, wherein the schedule includes a major frame including each of the time slices, the major frame repeating upon completion thereof.

3. The device of claim 2, wherein the first one of the first plurality of processes requests the time donation when the first one of the first plurality of processes does not require the processor.

4. The device of claim 2, wherein a second process from the sequence of two or more processes is executed during the time slice of the first one of the first plurality of processes for subsequent major frames.

5. The device of claim 1, wherein the scheduler maintains a stack for the first one of the first plurality of processes, the stack indicating whether the execution time of the first one of the first plurality processes has been donated to the sequence of two or more processes.

6. The device of claim 5, wherein the scheduler further maintains a status structure for each of the processes, the status structure indicating an identification of the first one of the plurality of processes for the sequence of two or more processes.

7. The device of claim 5, wherein the scheduler updates the stack to indicate that the sequence of two or more processes is to be run during the time slice of the first one of the first plurality of processes.

8. The device of claim 1, wherein the sequence of two or more processes does not execute in any time slice prior to receiving the time slice of the first one of the first plurality of processes.

9. A method, comprising:
- determining a time slice for each of a first plurality of processes;
- generating a schedule as a function of the time slices, the schedule including an order for each of the time slices for a respective one of the first plurality of processes;
- determining a time donation scheme for a first one of the first plurality of processes, the time donation scheme being indicative of a donation policy in which an execution time of the first one of the first plurality of processes is donated to a sequence of two or more processes from a second plurality of process;
- wherein each process in the sequence of two or more processes from the second plurality of processes is able to donate it's time to a subsequent process in the sequence of two or more processes from the second plurality of processes;
- a time donation chain comprising the first one of the plurality of processes and the sequence of two or more processes from the second plurality of processes;
- the donation policy indicating the time slice should be returned to the first one of the first plurality of processes upon completion of the sequence of two or more processes from the second plurality of processes;
- during execution of the processes in accordance with the schedule:
  - receiving, from a respective process in the time donation chain, a request to donate, to the a respective subsequent process in the time donation chain, the time slice of the first one of the first plurality of processes; and
  - determining whether the request complies with the donation policy;
  - when the request complies with the donation policy, disabling interrupts and executing the respective subsequent process during the time slice of the first process; and
  - upon return of the time slice to the first one of the plurality of processes, enabling interrupts; and
  - when the request does not comply with the donation policy, generating an error.

10. The method of claim 9, wherein the schedule includes a major frame including each of the time slices, the major frame repeating upon completion thereof.

11. The method of claim 10, wherein the first one of the first plurality of processes requests the time donation when the first one of the first plurality of processes does not require the processor.

12. The method of claim 10, wherein the sequence of two or more processes is executed during the time slice of the first process for subsequent major frames.

13. The method of claim 9, further comprising:
- maintaining a stack for each of the processes, the stack indicating whether the execution time of the first one of the first plurality of processes has been donated to the sequence of two or more processes.

14. The method of claim 13, further comprising:
- updating the stack to indicate that the sequence of two or more processes is to be run during the first one of the first plurality of processes.

15. The method of claim 9, wherein the sequence of two or more processes does not execute in any time slice prior to receiving the time slice of the first one of the first plurality of processes.

16. A non-transitory computer readable storage medium including a set of instructions executable by a processor, the set of instructions operable to:

determine a time slice for each of a first plurality of processes;

generate a schedule as a function of the time slices, the schedule including an order for each of the time slices for a respective one of the first plurality of processes;

determine a time donation scheme for a first one of the first plurality of processes, the time donation scheme being indicative of a donation policy in which an execution time of the first process is donated to a sequence of two or more processes from a second plurality of processes;

wherein each process in the sequence of two or more processes from the second plurality of processes is able to donate it's time to a subsequent process in the sequence of two or more processes from the second plurality of processes;

a time donation chain comprising the first one of the first plurality of processes and the sequence of two or more processes from the second plurality of processes;

the donation policy indicating the time slice should be returned to the first one of the first plurality of processes upon completion of the sequence of two or more processes from the second plurality of processes;

during execution of the processes in accordance with the schedule:

receiving, from the first one of the first plurality of processes, a request to donate, to the sequence of two or more processes, the time slice of the first one of the first plurality of processes; and determining whether the request complies with the donation policy;

when the request complies with the donation policy, disabling interrupts and executing the respective subsequent process during the time slice of the first one of the first plurality of processes; and upon returning of the time slice to the first one of the first plurality of processes, enabling interrupts; and when the request does not comply with the donation policy, generating an error.

\* \* \* \* \*